(12) United States Patent
Heidloff et al.

(10) Patent No.: US 9,833,837 B2
(45) Date of Patent: Dec. 5, 2017

(54) PASSIVATION AND ALLOYING ELEMENT RETENTION IN GAS ATOMIZED POWDERS

(71) Applicant: Iowa State University Research Foundation, Inc., Ames, IA (US)

(72) Inventors: Andrew J. Heidloff, West Des Moines, IA (US); Joel R. Rieken, Nevada, IA (US); Iver E. Anderson, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 428 days.

(21) Appl. No.: 14/120,706

(22) Filed: Jun. 18, 2014

(65) Prior Publication Data

US 2014/0373679 A1    Dec. 25, 2014

Related U.S. Application Data

(60) Provisional application No. 61/956,964, filed on Jun. 20, 2013.

(51) Int. Cl.
*B22F 9/08* (2006.01)
*B22F 1/02* (2006.01)

(52) U.S. Cl.
CPC .............. *B22F 1/02* (2013.01); *B22F 9/082* (2013.01); *B22F 2009/0844* (2013.01); *B22F 2998/10* (2013.01); *B22F 2999/00* (2013.01); *Y02P 10/295* (2015.11); *Y10T 428/2991* (2015.01)

(58) Field of Classification Search
None
See application file for complete search history.

(56) References Cited

U.S. PATENT DOCUMENTS

| | | | |
|---|---|---|---|
| 1,972,317 A | 9/1934 | Reimers | 75/17 |
| 5,125,574 A | 6/1992 | Anderson | 239/8 |
| 5,368,657 A | 11/1994 | Anderson | 148/400 |
| 5,372,629 A | 12/1994 | Anderson | 75/332 |
| 5,451,366 A * | 9/1995 | Kumagai | C22C 1/0491 148/269 |

(Continued)

FOREIGN PATENT DOCUMENTS

JP    61-287424    12/1986
WO    WO2009/006954    * 1/2009

OTHER PUBLICATIONS

Alexander Donchev et al, Comparison of different fluorine treatments for the production of TiAl-alloys against high temperature oxidation, Mater. Sci. Forum, 638-642, p. 1294, 2010.

(Continued)

*Primary Examiner* — Jessee Roe
*Assistant Examiner* — Ngoclan T Mai

(57) ABSTRACT

A method for gas atomization of a titanium alloy, nickel alloy, or other alumina ($Al_2O_3$)-forming alloy wherein the atomized particles are exposed as they solidify and cool in a very short time to multiple gaseous reactive agents for the in-situ formation of a passivation reaction film on the atomized particles wherein the reaction film retains a precursor halogen alloying element that is subsequently introduced into a microstructure formed by subsequent thermally processing of the atomized particles to improve oxidation resistance.

14 Claims, 5 Drawing Sheets

(56) References Cited

U.S. PATENT DOCUMENTS

| | | | |
|---|---|---|---|
| 5,589,199 A | 12/1996 | Anderson | 425/10 |
| 5,811,187 A | 9/1998 | Anderson | 428/403 |
| 6,142,382 A | 11/2000 | Ting | 239/8 |
| 6,283,195 B1 * | 9/2001 | Chandley | B22D 17/2023 164/113 |
| 6,358,466 B1 | 3/2002 | Besser | 266/234 |
| 6,425,504 B1 | 7/2002 | Besser | 222/593 |
| 6,533,563 B1 | 3/2003 | Otaigbe | 425/6 |
| 2010/0119402 A1 | 5/2010 | Paul | 419/33 |
| 2013/0306205 A1 | 11/2013 | Anderson | |

OTHER PUBLICATIONS

A. Donchev et al, Thermodynamic consideratons of the beneficial effect of halogens on the oxidation resistance of TiAl-based alloys, Intermetallics, 11, p. 387-398, 2003.

Murray Jacobson et al, Bureau of Mines Report of Investigation, No. 6516, 1964.

Masaki Kumagai et al, Influence of chlorine on the oxidation behavior of TiAl—Mn intermetallic compound, Intermetallics, 4, p. 557-566, 1996.

P. Mathur et al, Analysis of the Spray Deposition Process, Act. Metall. Mater., 7, p. 429-443, 1989.

J.W. Rogers et al, Low Temperature Diffusion of Oxygen in Titanium and titanium Oxide Films, Applied Surface Science, p. 137-152, 1988-1989.

M. Schutze et al, Improvement of the oxidation resistance of TiAl alloys usiing the chlorine effect, Materials Science and Engineering, A239-240, p. 847-858, 1997.

Elizabeth Vileno et al, Thermal Decomposition of NF3 by Ti, Si, and Sn Powders, Chem. Mater., 7, p. 683-687, 1995.

N.B. Vaughan, Oxidation of Titanium, The Journal of the Institute of Metals, vol. 89, p. 128-136, 1960-1961.

I.E. Anderson et al, Highly Tuned Gas Atomization for Controlled Preparation of Coarse Powder, MATWER, vol. 41, No. 7, p. 504-512, 2010.

J.R. Reiken et al, Oxidation Predictions for Gas Atomization Reaction synthesis (GARS) Porcessing, Advances in Powder Metallurgy and Particulate Materials, 2, p. 35, 2012.

A.J. Heidloff et al, Evaluation of Clsoe-Coupled Atomization of Titanium Aluminide and Resulting Mircostructures, Advances in Powder Metallurgy and Particulate Materials, 2, 2012.

* cited by examiner

Fig. 1

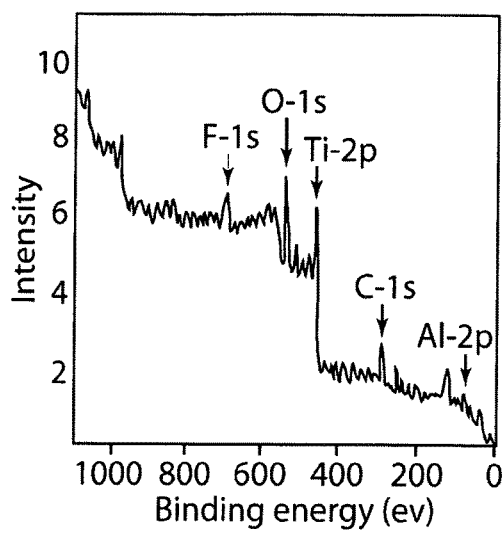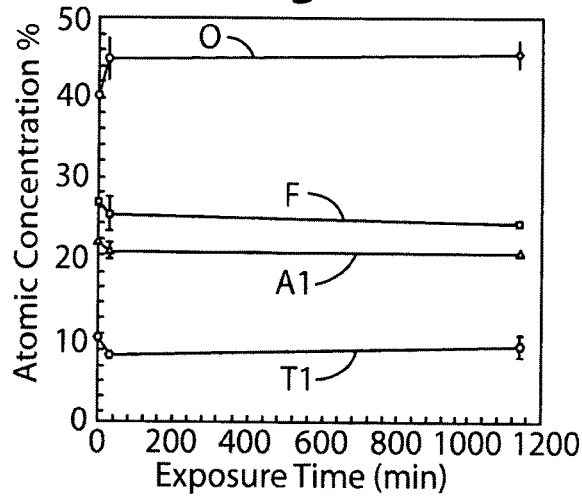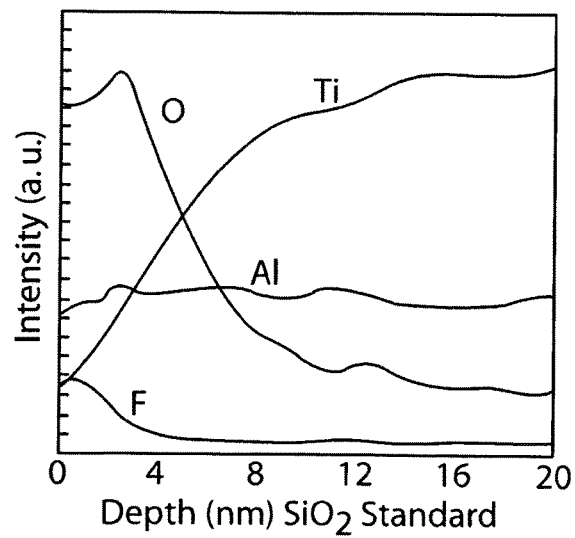

PASSIVATION AND ALLOYING ELEMENT RETENTION IN GAS ATOMIZED POWDERS

RELATED APPLICATION

This application claims benefit and priority of U.S. provisional application Ser. No. 61/956,964 filed Jun. 20, 2013, the entire disclosure of which is incorporated herein by reference.

CONTRACTUAL ORIGIN OF THE INVENTION

The United States Government has rights in this invention pursuant to Contract No. DE-AC02-07CH11358 between the U.S. Department of Energy and Iowa State University and pursuant to United States Army Contract No. W15QKN-11-2-0008.

FIELD OF THE INVENTION

The present invention relates to atomizing a reactive metal alloy with end use ability to form a protective $Al_2O_3$ scale (i.e. on components consolidated from the atomized powder) for in service protection, wherein atomizing is conducted in a manner to form a thin reaction product layer (e.g. metallic oxy-fluoride layer) on the atomized particle surfaces and wherein the oxy-fluoride layer includes an amount of a halogen species retained therein as a precursor alloying element for later release into a microstructure formed by subsequent thermal processing of the atomized particles to improve oxidation resistance.

BACKGROUND OF THE INVENTION

It has been previously shown that the addition of halogens (e.g. fluorine or the like) to the surface of intermetallic-based titanium alloys, such as TiAl, has a profound effect on the oxidation resistance of such alloys [Schütze et al. 1997 and Kumagai et al. 1996]. The presence of halogens is believed to provide a mechanism of increased aluminum flux to the surface, thereby allowing the alloy to form a protective $Al_2O_3$ scale and prevent further oxidation of the alloy. A method for introducing halogens, such as ion implantation, into cast TiAl components has proved to be difficult and expensive [Donchev et al. 2010]. Additionally, results indicate that nearly 70% of the surface halogen is lost after one minute of exposure at 900° C. with a 99% loss after 10 minutes of exposure [Donchev et al. 2003].

In order to introduce a halogen into the bulk of a component and create a reservoir of halogen for improved oxidation resistance, a powder metallurgy approach was previously suggested [Paul et al. 2010] where a halogen-containing gas is used during atomization to alloy the halogen with molten droplets and then solidify into powder therefore containing the halogen in the powder and the bulk component when consolidated. However, there are drawbacks to this single-step atomizing approach, first is that the rate of reaction is extremely rapid at molten titanium temperatures and it is difficult to predict and control the amount of halogen in the resulting solidified powders. Another potential limitation is that if the halogen is in solution in the molten state and in the subsequently solidified powders, no passivation (protective) coating on the powder exists and handling highly reactive powders (i.e. Ti-based) with no passivation can be difficult and dangerous [Jacobson et al. 1964]. Furthermore, the use of a halogen at such high temperatures may have unwanted chemical reactions. For example, if sufficient halogen, such as fluorine, is present near the surface of a molten droplet, titanium fluorides such as $TiF_3$ and $TiF_4$ may form and subsequently volatize into toxic gases [K. Katamura et al. 1986]. Additionally, if halogen containing gasses such as $NF_3$ or $SF_6$ are used, the unwanted constituents of N or S may also be introduced into the molten alloy droplets, resulting in degraded properties.

SUMMARY OF THE INVENTION

The present invention involves a method of atomizing an $Al_2O_3$-forming metal alloy involving the steps of gas atomizing a molten $Al_2O_3$-forming metal alloy, such as a titanium alloy or nickel alloy, to form a spray of atomized particles in a chamber, exposing the atomized particles in the chamber to a gaseous first reactive species, such as for example oxygen, and a gaseous second reactive halogen species, such as for example fluorine, in a manner to form a surface layer on the atomized particles wherein the surface layer comprises a reaction product of a metal of the metallic material and the first reactive species and wherein the reaction product includes an amount of the second reactive halogen species, such as for example fluorine, retained therein as a precursor alloying element for release into a microstructure formed by subsequent thermal processing of the atomized particles to improve oxidation resistance. The reaction product can be a metal oxy-fluoride for example.

The present invention thus envisions the further step of thermally processing the atomized particles in a manner to form a consolidated body having a microstructure in which the halogen element is introduced either as a solid solution alloying element or a halogen-enriched precipitate, or both, in an effective amount to improve the consolidated body's oxidation resistance by assisting in formation of a protective $Al_2O_3$ layer on the consolidated body, wherein thermal processing of the atomized particles can include, but is not limited to, hot isostatic pressing, pressing and sintering, spark plasma or other sintering, hot extrusion, hot metal particle injection molding, and additive manufacturing techniques such as laser or electron-beam engineering net shaping or direct laser or electron beam metal sintering known as 3-D printing.

Other advantages and features of the present invention will become more readily apparent from the following detailed description taken with the following drawings.

BRIEF DESCRIPTION OF THE DRAWINGS

Figure 1:
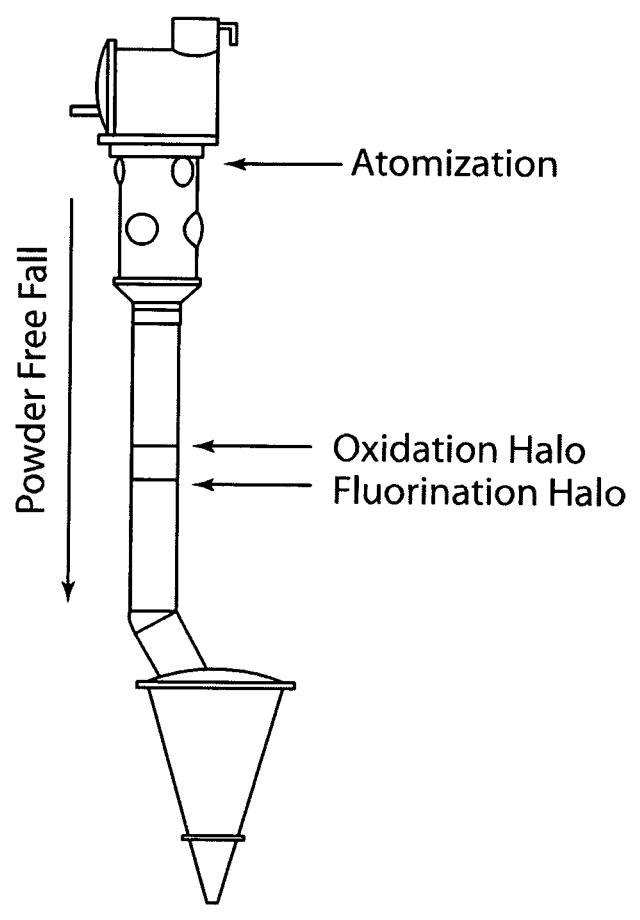

FIG. 1 is a schematic view of atomization apparatus showing an atomization region (atomization) where molten metal break-up occurs, a downstream region where the solidified powder particles are coated with a thin oxide film or layer (oxidation halo), and a farther downstream region where the oxide film is converted to an oxy-fluoride film or layer (fluorination halo).

FIG. 1b is enlarged view of the first reactive species injection halo (oxidation halo) and second downstream reactive species injection halo (fluorination halo) of FIG. 1a.

FIG. 3a is XPS spectra from co-passivated Ti-48Al-2Cr-2Nb with pertinent peaks labeled and FIG. 3b shows surface chemistry evolution in the unexposed state (time=0) and after exposure to air.

FIG. 4 shows a Auger Electron Spectroscopy (AES) depth profile of co-passivated Ti-48Al-2Cr-2Nb powder.

DETAILED DESCRIPTION OF THE INVENTION

Figure 1A:
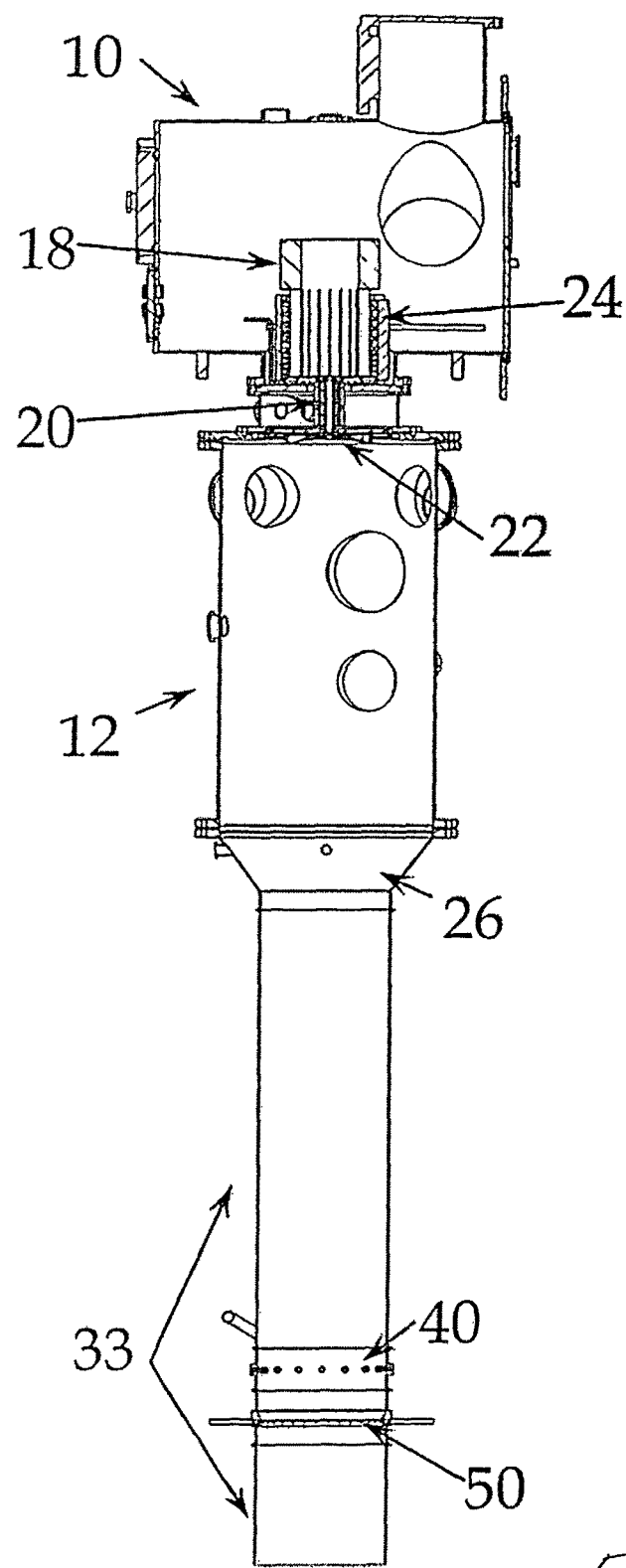
FIG. 1a is a schematic view of the atomization apparatus showing a first reactive species injection halo (oxidation halo) and second downstream reactive species injection halo (fluorination halo) for practicing an embodiment of the invention.

Although the present invention is described herebelow in connection with the in-situ passivation and alloying element retention of a particular gas atomized particular titanium aluminum alloy, the invention can be practiced using 1) titanium alloys that include, but are not limited to, intermetallic TiAl, intermetallic TiAl alloyed with alloying elements such as Cr, Mo, Nb, V, etc., as well as other titanium alloys (intermetallic or not) that contain at least about 20 atomic % Al; 2) nickel alloys that include, but are not limited to, intermetallic NiAl alloyed or not with alloying elements, nickel based superalloys such as Inconel 738 and other nickel base superalloys that are used as gas turbine engine components, or 3) any other Al-containing metal alloy containing sufficient Al, such as at least about 20 atomic %, to potentially form an $Al_2O_3$ layer (alumina layer) upon thermally consolidation of the atomized powder that is oxidation resistant, where a protective $Al_2O_3$ scale is beneficial but is kinetically hindered upon elevated temperature exposure in ambient air. Regardless of the metal or alloy powder being processed, the present invention involves gas atomization of the reactive metal alloy wherein the atomized particles are exposed after they solidify and cool in the very short available time (e.g. fractions of a second) in an atomization spray chamber to multiple gaseous reactive agents for the in-situ formation of a passivation and alloying element retention reaction film on the atomized particles. The gaseous reactive species (agents) are introduced into the atomization chamber at locations downstream of a gas atomizing nozzle as determined by the powder metal or alloy composition, the desired powder or particle temperature for the reactions, and the desired thickness of the reaction film.

Although the example describes in-situ passivation and alloying element retention of a particular gas atomized titanium aluminum alloy using oxygen and fluorine as the first and second reactive gaseous species, respectively, the invention can be practiced using other reactive gas species, such as nitrogen or a carbonaceous gas (e.g., CO) for the first reactive gaseous species and other halogen elements (e.g. Cl, Br, and/or I) for the second reactive gaseous species.

Example

The following Example for making a particular titanium aluminide alloy powder is offered to further illustrate but not limit the present invention:

Experimental Procedure

A 10.2 cm diameter virgin ingot of Ti-48-2-2 (Ti-48Al-2Cr-2Nb at %) was used in the experimental procedure. The ingot height was 14 cm, and the ingot weighed 4.38 kg. The gas atomization system (described below—FIGS. 1 and 1A) was evacuated to 142 millitorr and backfilled with high purity (HP) Argon. The ingot was melted using a cold wall induction copper crucible and a 150 kW induction power supply at 3 kHz. The molten metal was poured through a multi-layer composite pour tube having a $Y_2O_3$ liner layer contacting the melt and atomized with an open wake close-coupled atomization die with HP (high purity) Argon at 5.2 MPa. The pour tube is generally as described in U.S. Pat. Nos. 6,425,504 and 6,358,466, which are incorporated herein by reference. This process generated a distribution of powders with a diameter from single micron up to greater than 300 microns in size. The two-step reaction passivation of the powders was conducted using two (2) individual "reaction" halos, with the first being the oxidation halo and the second being the fluorination halo, as schematically presented in FIGS. 1, 1a, and 1b.

The downstream location of both reaction halos was determined by first establishing the temperature(s) at which the passivation reaction(s) should take place. The first reaction, being the oxidation of the powders was established by determining a temperature corridor for reaction. The high end of the corridor is bound by the temperature where the oxygen will not diffuse into the metal but will create an oxide layer (passivation layer). Multiple studies on the oxidation of titanium have shown that this upper bound is in the 400-600° C. range [Rogers et al. 1989 and Hurlen 1960], while the lower bound is determined by having sufficient thermal energy for the formation of a continuous scale. With the oxidation halo, there is no lower bound as room temperature oxidation (native oxide) will be sufficiently thick for further processing.

For the fluorination halo, a similar reaction corridor was established for the fluorine reaction. The order of reaction (first oxygen then fluorine as previously discussed) determined the upper bound for the reaction in the range of 400-600° C. based on the oxidation upper bound. The use of $NF_3$ as the fluorination halo gas determines the lower bound of the reaction temperature corridor. There must be sufficient thermal energy and chemical stability to break the bond of the $NF_3$ molecule to fluorinate the surface of a metallic specimen. Previous work on fluorination of titanium found high conversion (i. e. reaction) rates at temperatures of 300-400° C. [Vileno et al.]. The reaction conditions for both halos were then defined as Oxidation: 400-600° C. and Fluorination: 300-400° C.

With the reaction temperatures determined, the downstream location in which the powders would be at the predefined temperatures was calculated. Previous work [Mathur et al. 1989] on combination convective-radiative heat-transfer modeling for particulate was adapted [Rieken et al. 2012] to establish cooling curve profiles for atomized particulate within the free-fall chamber of the atomization system.

Thermophysical properties of titanium (and titanium aluminide when available) were incorporated into the cooling curve model to establish temperature vs. distance correlations and to determine a distance range in which the particles were at the desired reaction temperature. Since the reaction halo positions were not infinitely flexible as a result of mechanical fixturing, halo positions were used that were as close as possible to the desired reaction temperatures. For the oxidation halo, this was at a position 2.2 meters downstream of the atomization die. Since the fluoride reaction range was just below that of the oxidation reaction, the fluorination halo was placed about 10 centimeters below the oxidation halo (see FIGS. 1, 1a, 1b).

With the reaction temperatures and corresponding reaction halo distances set, the reaction gas compositions were determined. Previous single stage passivation [Heidloff et al. 2012] had shown that Ar+0.19 vol % $O_2$ was sufficient for the formation of a 3-5 nm thick oxide scale on titanium-based alloys during atomization. This value was twice as thick as the target of 1.5-2.5 nm, therefore in this multistep passivation, the oxygen content was dropped by half to Ar+0.095 vol % $O_2$ and was accomplished by mixing "on-the-fly" compressed gas cylinders of HP Ar and HP Ar+0.19 vol % $O_2$ (see Table 1).

For the purposes of this experiment, a halo pressure of 1.7 MPa was used for the Ar+$NF_3$ mixture. A $NF_3$ conversion factor of 8-9% was estimated based on previous singles-stage passivation to define the mass flow rate of $NF_3$. Based on the halo jet orifice configuration, a Ar+ of 0.28 vol % $NF_3$ concentration was determined (see Table 1).

TABLE 1

Summary of reaction halo temperature and gas concentration conditions for use in the multistep passivation system for Ti—48Al—2Cr—2Nb:

| Reaction Halo | Reaction Temperature, ° C. | Gas Composition |
| --- | --- | --- |
| Oxidation | 400-600 (target) | Ar + 0.095 vol % $O_2$ |
| Fluorination | 300-400 (target) | Ar + 0.28 vol % $NF_3$ |

Results

Figure 2:
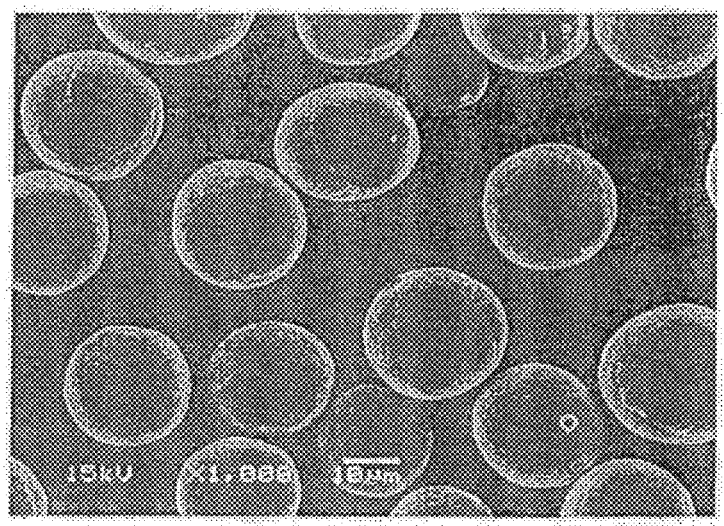
FIG. 2 is a SEM Image of 20-25 μm (diameter) as-atomized powder made using the multistep passivation method

The powder created during the atomization was collected (isolated) in ball valved-containers and was moved, unexposed, to a glove box for classification. After spin-riffling, samples were mechanically screened to specific size ranges. A representative image of powders is shown in FIG. 2. While there were a few irregular particles, most particles are highly spherical and have very few or no satellites. A sample of dia.<45 μm powder, along with the mentioned size fractions above, were sent to a third party for wet chemistry analysis. The bulk powder chemistry is summarized in Table 2, along with detection methods. The metallic elements of Ti, Al, Cr, and Nb all fell within the specified range for the particular alloy. The oxygen content of the dia.<45 μm size fraction (i.e., 1300 ppmw) is identical as the previous atomization run presented elsewhere [Heidloff et al. 2012]. Furthermore, nitrogen was well within specification but carbon was slightly in excess, which is likely due to cutting fluid and grit blast contamination within the shrinkage cavity of the as-solidified ingot used as charge material.

TABLE 2

Bulk chemistry of sample of <45 μm powder with respective methods of composition analysis:

| Element | Wt % | Method |
| --- | --- | --- |
| Ti | 58.9 | By Difference |
| Al | 33.4 | ICP |
| Cr | 2.7 | ICP |
| Nb | 4.7 | ICP |
| O (ppmw) | 1300 | Leco |
| N (ppmw) | 34 | Leco |
| C (ppmw) | 400 | Leco |
| F (ppmw) | 190 | Pyrohydrolysis followed by Ion Chromatography |
| Y (ppmw) | 50 | ICP-MS |
| Zr (ppmw) | 80 | ICP-MS |

For further analysis, samples from the size ranges of 20-25, 38-45, and 75-90 μm, in the unexposed condition (not exposed to ambient air), were analyzed for only oxygen, fluorine, and nitrogen content. These results are presented in Table 3, and clearly indicate a decrease in both oxygen and fluorine content with increasing powder size (i. e. decreasing surface area) and provides strong evidence that the oxygen and fluorine present on these powders is present as a surface film. The slight increase in nitrogen, on only the finest powders, indicated that the nitrogen is most likely present within the powder matrix and that very little if any is present in the surface film. This also is in agreement with previous work that has found that there is no consistent pick-up of nitrogen when $NF_3$ is used for fluorine additions.

TABLE 3

Interstitial element concentrations as a function of bulk chemistry for the given powder size fractions:

| Powder Size Range (μm) | Oxygen (ppmw) | Fluorine (ppmw) | Nitrogen (ppmw) |
| --- | --- | --- | --- |
| 20-25 | 1400 | 220 | 63 |
| 38-45 | 1100 | 110 | 32 |
| 75-90 | 1000 | 68 | 32 |

Surface characterization techniques of Auger Electron Spectroscopy (AES) and X-ray Photoelectron Spectroscopy (XPS) were used to evaluate further the multistep passivated coating chemistry. Unexposed powder was taken with a special XPS sample holder from the glove box to the XPS for surface characterization without the powders being exposed to air. This method allowed for removal of possible contamination sources of oxygen. A representative XPS spectrum in shown in FIG. 3a, with the relevant peaks labeled. Powders from the three size ranges were all characterized and showed nearly identical surface chemistries and were therefore averaged together to yield a non-exposed surface chemistry (FIG. 3a exposure time=0). The exact same powders were then exposed for durations of time to air at room temperature and re-examined in the XPS for surface chemistry. Again, the size ranges of powder showed nearly the same chemistry. The air exposure summary in FIG. 3b clearly indicates that the presence of both fluorine and oxygen on the alloy surface initially change by a small amount and remain stable thereafter. The change in surface chemistry is nominal and provides a very stable surface modification without the need for special storage. The atomized powder particles have a metal oxy-fluoride layer (e.g. a titanium and/or aluminum oxy-fluoride layer).

Additionally, AES depth profiles were conducted to determine the thickness of the multistep passivation surface coating (metal oxy-fluoride layer) on the powders. A depth profile summary generated from an average of five different depth profiles for multiple powder sizes is presented in FIG. 4. Based on a standard $SiO_2$ etch rate, the thickness of the fluorine and oxygen-containing layer is about 4 nm, while the oxygen only-containing portion of the coating goes to a depth of about 7 nm.

A small sample of atomized powders (dia.<45 um) also was subjected to a spark test with a Tesla coil on a non-grounded piece of stainless steel foil. The multistep passivated Ti-48-2Cr-2Nb powder (RMA-61) with a particle size of dia.<45 μm showed no burning or reaction with the induced spark. As a comparison, Ti-6Al-4V powder of the same size range (i.e., dia.<45 μm), which was produced by a traditional gas atomization process (i.e., no passivation)) flash burned upon contact with the induced spark. The result provides evidence that the multistep in situ passivation of highly reactive powders is more protective than the native oxide film that forms during exposure to air.

Furthermore, a small batch of powder from this initial experimental atomization trial was consolidated using spark plasma sintering under vacuum using the following parameters: 60 MPa uniaxial pressure at 1190° C. for 3 minutes. The oxidation resistance of these test components was then evaluated and the results were quite promising.

Figure 1B:
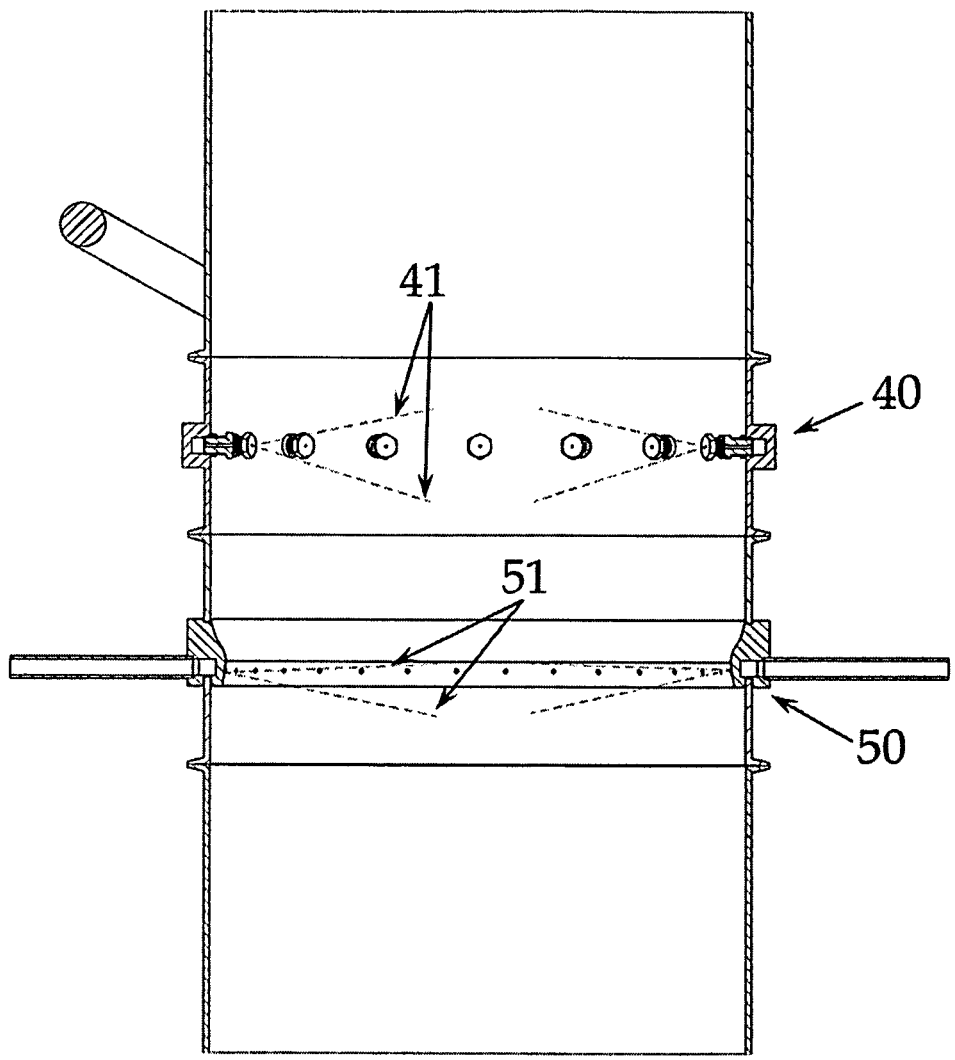

It is apparent that practice of the present invention provides a strategic orientation of passivation halos (i.e., the Ar—O$_2$ (oxidation) halo above the Ar—NF$_3$ (fluorination halo)—see FIG. 1a, 1b) to create a multistep reaction zone that first promotes the formation of a nanometric oxide film ((Ti,Al)—O) on the surface of individual powders (in the solid state) that was converted to a highly robust oxyfluoride layer ((Ti,Al)—O—F—see FIG. 4). The pre-oxidized surface formed a thermally stable halogen-containing surface film.

This surface passivation film allowed the as-atomized powders to be safely handled in "open air" and the powders did not ignite during a "spark" test. Moreover, this oxyfluoride surface film was shown to be mechanically robust and stable in air, since it was found to be intact following the mechanical sieving process used to size classify the powders and also after the powders were exposed to ambient conditions for up to 19 hrs. (see FIG. 3a, 3b and FIG. 4).

Atomization Apparatus:

A modified high pressure gas atomization system (HPGA) located at the Ames laboratory, Ames, Iowa, was used for conducting high pressure gas atomization (HPGA) of the Ti-48Al-2Cr-2Nb alloy to produce passivated Ti-48Al-2Cr-2Nb alloy powders in accordance with an illustrative embodiment of the present invention. The gas atomization system is generally as described in U.S. Pat. Nos. 5,372,629; 5,589,199; and 5,811,187, which are incorporated herein by reference and is shown schematically in FIGS. 1 and 1a, 1b. The basic gas atomization system includes a melting chamber 10, a drop tube (spray chamber) 12 beneath the melting chamber and which was 61 cm in diameter and approximately 91 cm tall, and a powder collection chamber (not shown) along with an exhaust cleaning system (not shown). The melting chamber 10 on top of the spray chamber 12 contained the melt system. The melt system included a melting crucible 18, and pour tube 20 of the type described and shown in FIG. 1A of U.S. Pat. Nos. 6,358,466 and 6,142,382, which is also incorporated herein by reference. The crucible was made of water-cooled copper, and the pour tube was made of successive layers of yttria, tungsten, and yttria-stabilized zirconia (YSZ) for handling molten Ti-48Al-2Cr-2Nb. The pour tube is generally described in U.S. Pat. Nos. 6,425,504 and 6,358,466, which are incorporated herein by reference. A conventional water-cooled induction coil 24 was disposed around the crucible 18 to heat the Ti-48Al-2Cr-2Nb charge in the crucible. The pour tube was placed into the bottom of the crucible 18 and then slipped into a molybdenum alloy (TZM) insert, which was then placed through the central orifice of the close coupled gas atomization nozzle 22 positioned just beneath the crucible 18 as described and shown in FIG. 2 of U.S. Pat. No. 5,125,574, which is incorporated herein by reference.

The melting chamber 10 and main spray chamber 12 of the gas atomizing system were not isolated from each other by vacuum seals, but each had a pressure relief valve to prevent excessive buildup in either chamber section during a trial run. There was a viewport on the melting chamber to monitor the condition of the charge in the crucible 18 and confirm melting. Two more viewports were located near the top of the spray chamber 12 as shown and were used to monitor melt break-up visually during atomization. The Ti-48Ali-2Cr-2Nb ingot was melted using a cold wall induction copper crucible 18 and a 150 KW induction power supply at 3 kHz.

Molten Ti-48Al-2Cr-2Nb exited from the yttria lined-composite pour tube 20 and was immediately impinged by the atomization gas jets from a gas atomizing nozzle 22 of the close-coupled type as described in U.S. Pat. No. 5,125,574, which is incorporated herein by reference. The gas atomizing nozzle had a 14 degree jet apex angle, 60 discrete circular gas jets, and each jet having a diameter of 0.074 mm (0.029 inch). The atomization gas was high purity (HP) argon at high pressure (e.g. 5.2 MPa) and a trumpet bell pour tube (shown in: Otaigbe, J., McAvoy, J., Anderson, I. E., Ting, J., Mi, J., and Terpstra, R. L., "Atomizing Apparatus for Making Polymer and Metal Powders and Whiskers," U.S. Pat. No. 6,533,563, Mar. 18, 2003 and in: I. E. Anderson, D. Byrd, and J. L Meyer, "Highly Tuned Gas Atomization for Controlled Preparation of Coarse Powder," MATWER, vol. 41, no. 7(2010), pp. 504-512, both of which are incorporated herein by reference) were used as the atomization gas to produce atomized powders with an average particle diameter of 150 microns.

Referring to FIGS. 1, 1a, 1b, located downstream 2.2 meters from the gas atomizing nozzle 22 was a stainless steel gas manifold integrated into the drop tubes 33 to form a first reactive species halo 40 with 16 holes, each having a diameter of 1.6 mm (0.063 inch), and having a halo diameter of 30.5 cm. The injection angle of zero degrees from horizontal pointed towards the centerline of the drop tubes 33 as shown by the gas streamlines 41 in FIG. 1b. In this way the gaseous first reactive species (fluorinating gas) would be forced to fill the entire cross-sectional area quickly at the injection level and allowed to react with powders falling through the drop tubes 33. Argon with 0.095 volume % oxygen was injected into the drop tubes 33 through this halo to provide the first gaseous reactive species, i.e. oxygen. The argon/oxygen mixture was introduced at a pressure of 1.7 MPa from a mixed gas cylinder.

A second reactive species injection halo 50 was located slightly further downstream, at approximately 10 centimeters below the oxidation halo 40 to inject a second gaseous reactive species (i.e. 0.28 volume % NF$_3$ gas and balance Ar) into the drop tubes 33. The halo 50 comprised a stainless steel gas manifold similar to the oxidation halo 40 and having the same halo diameter as halo 40 (30.5 cm). The second species injection halo 50 contained 32 jet holes each with a diameter of 1.0 mm (0.04 inches). The HP NF$_3$+Ar gas mixture was supplied at a pressure of 1.7 MPa. The holes on the second reactive species halo 50 were pointed at an 8 degree angle from horizontal towards the middle of the chamber as shown by the gas streamlines 51 in FIG. 1b. In this way the gaseous second reactive species (fluorinating gas) would be forced to fill the entire cross-sectional area quickly at the injection level and allowed to react with powders falling through the drop tubes 33 but with a downward angle the second reactive species will not spread into the first reactive species area.

Although this illustrative embodiment of the present invention employs the second injection halo 50 downstream of the first injection halo 40 in the drop tubes 33, the invention also envisions (in other situations) injecting the first and second reactive species at the same level and/or in the atomization spray chamber 12 with control over the mass flow rates of the gaseous first and second reactive species into the chamber to expose the atomized particles concurrently to the gaseous first and second reactive species in a sequential manner to form the protective layer.

Referring to FIG. 1, attached to the bottom of the spray chamber 12 is a conical reducer 26 that reduced the diameter of the chamber from 2 feet to 1 foot. Powder reaching this point would then pass through the drop tubes 33 and reaction halos 40 and 50, finally into a cyclone separator (not shown). Inside the separator, powders and flake fell to the bottom and the gas exited through the top of the cyclone. Any remaining metal powder after this point was extremely small and was collected in a wet scrubber (not shown).

The atomizer was assembled from the top down using a hoisting system. When complete, the atomizer stood as tall as the ceiling in a high-bay laboratory, about 20 feet tall, and was bolted to support beams on the ceiling. The entire system could be evacuated by a roughing pump to less than 142 millitorr and then backfilled with HP argon before turning on the crucible induction coil and melting the Ti-48Al-2Cr-2Nb charge. The temperature of the charge was monitored by a non-contact single-color optical pyrometer through a quartz window viewing port. For atomizing Ti-48Al-2Cr-2Nb, the pour tube orifice was selected to be 3.2 mm (0.125 inch) inner diameter. The ingot of Ti-48Al-2Cr-2Nb was melted in crucible 18, which was calculated to provide a maximum of 60 seconds of melt flow, and because of the wider melt stream exiting the pour tube the atomization pressure was increased to 750 psig (5.2 MPa). The charge was heated to a temperature just above the liquidus, as is typical for cold-wall induction melting.

Upon heating and melting the Ti-48Al-2Cr-2Nb charge the melt stream initiates within 60 seconds of a fully liquid charge. After the melt stream has initiated the atomization gas and two gas halos were turned on. Molten Ti-48Al-2Cr-2Nb exited from the pour tube and was immediately impinged by the atomization gas stream from the atomizing nozzle 22. During gas atomization, proper stream break-up will cause the stream to bloom to the edges of the pour tube. When the melt flow stopped, the atomization gas and halos were allowed to run for an additional time of approximately 15-20 seconds. In this way, if the powder had failed to completely react, more oxygen and $NF_3$ was made available to complete the reaction before opening the atomizer when the entire system returns to room temperature, e.g., later in the day.

The present invention thus envisions the further step of thermally processing the atomized particles in a manner to form a consolidated body having a microstructure in which the halogen element is introduced either as a solid solution alloying element or a halogen-enriched precipitate, or both, in an effective amount to improve the body's oxidation resistance wherein thermal processing of the atomized particles can include, but is not limited to, hot isostatic pressing, pressing and sintering, spark plasma or other sintering, hot extrusion, hot metal particle injection molding, and additive manufacturing (AM) techniques such as laser or electron-beam engineering net shaping or direct laser or electron beam metal sintering known as 3-D printing. The amount of the second reactive halogen species provided in the reaction product can be adjusted using the process of the invention as determined empirically or otherwise to accommodate any loss of that species resulting from use of such AM techniques. The thermal processing is conducted at a temperature, time, and other manner to dissolve the metal oxyfluoride layer so that its oxygen and halogen constituents (e.g. oxygen and fluorine) are present in the consolidated body in a manner to assist in formation of a protective $Al_2O_3$ layer on the consolidated body that otherwise might not form in the absence of the halogen element.

REFERENCES, WHICH ARE INCORPORATED HEREIN BY REFERENCE

M. Schiltze, and M. Hald, Mater. Sci. Engin., 1997, A239-240, p. 847.

M. Kumagai, K. Shibue, M-S. Kim, and M. Yonemitsu, Intermetallic, 1996, 4, p. 557.

A. Donchev, and M. Schiltze, Mater. Sci. Forum, 2010, 638-642, p. 1294

A. Donchev, B. Gleeson, and M. Schiltze, Intermetallics, 2003, 11, p. 387

Paul et al., GKSS, Patent Application Publication, Pub. No. US 2010/0119402 A1, May 13, 2010.

M. Jacobson et al., Bureau of Mines Report of Investigation, No. 6516, 1964.

K. Katamura et al., Japanese Patent Application, Application No. 60-125114, Nov. 6, 1985.

J. W. Rogers, et al., Applied Surface Sci., 1988, 35, p. 137. T. Hurlen, J. Institute of Met., 1960, 89, p. 128. E. Vileno, et al., Chem. Mater., 1995, 7, p. 683. P. Mathur, et al., Acta Metall. Mater., 1989, 37, p. 429.

J. R. Rieken, et al., Advances in Powder Metallurgy and Particulate Materials, 2012, 2, p. 35.

A. J. Heidloff et al., Advances in Powder Metallurgy and Particulate Materials, 2012, 2, p.

Although the present invention has been described in connection with certain embodiments, those skilled in the art will appreciate that changes and modifications can be made therein with the scope of the invention as set forth in the appended claims.

We claim:

1. A method of atomizing an $Al_2O_3$-forming metal alloy, comprising gas atomizing a molten $Al_2O_3$-forming alloy to form a spray of atomized particles in an atomization chamber, first exposing the atomized particles in the atomization chamber downstream of an atomizing nozzle to a gaseous first reactive species to form a reaction product as a surface layer on the atomized particles and then exposing the surface layer on the atomized particles to a gaseous second reactive halogen species in the atomization chamber in a manner that an amount of the second reactive halogen species is retained in the surface layer on the atomized particles.

2. The method of claim 1 wherein the alloy is selected from the group consisting of a titanium alloy and a nickel alloy.

3. The method of claim 2 wherein the titanium alloy comprises titanium aluminide.

4. The method of claim 2 wherein the nickel alloy comprises a nickel base superalloy.

5. The method of claim 2 wherein the first reactive species is oxygen.

6. The method of claim 5 wherein the surface layer comprises an oxide product including titanium, aluminum, oxygen and a halogen element.

7. The method of claim 5 wherein the reaction product comprises an oxide including nickel, aluminum, oxygen, and the halogen element.

8. The method of claim 1 wherein the second reactive halogen species comprises fluorine.

9. The method of claim 1 including the further step of thermally processing the atomized particles in a manner to form a consolidated microstructure in which a halogen element is introduced from the surface layer into the microstructure to improve oxidation resistance.

10. The method of claim 9 including thermally processing the particles by one or more of hot isostatic pressing, pressing and sintering, spark plasma or other sintering, extrusion, metal particle injection molding, and additive manufacturing techniques including at least one of laser engineering net shaping, electron-beam engineering net shaping, and direct laser or electron-beam metal sintering.

11. The method of claim 1 wherein the molten alloy is atomized using an atomizing nozzle having inert gas jets.

12. The method of claim 1 wherein the gaseous first reactive species is injected into the atomization chamber by a first injection halo and the gaseous second reactive species is introduced into the atomization chamber by a second injection halo disposed downstream of the first injection halo.

13. The method of claim 1 wherein the atomization chamber is evacuated and backfilled with an inert gas before atomizing the molten alloy to promote an inert atmosphere to which the first reactive species and the second reactive species are introduced by injection halos flows.

14. The method of claim 1 including the further step of consolidating the particles.

* * * * *